(12) United States Patent
Hayashi et al.

(10) Patent No.: US 10,748,256 B2
(45) Date of Patent: Aug. 18, 2020

(54) POINT IMAGE RESTORATION DEVICE AND METHOD

(71) Applicant: FUJIFILM Corporation, Tokyo (JP)

(72) Inventors: Kenkichi Hayashi, Saitama (JP); Yousuke Naruse, Saitama (JP); Yasunobu Kishine, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 68 days.

(21) Appl. No.: 16/110,164

(22) Filed: Aug. 23, 2018

(65) Prior Publication Data

US 2018/0365811 A1    Dec. 20, 2018

Related U.S. Application Data

(63) Continuation of application No. PCT/JP2017/006420, filed on Feb. 21, 2017.

(30) Foreign Application Priority Data

Feb. 26, 2016  (JP) .................................. 2016-036197

(51) Int. Cl.
*G06T 5/00* (2006.01)
*G06T 5/20* (2006.01)
(Continued)

(52) U.S. Cl.
CPC ................ *G06T 5/003* (2013.01); *G06T 5/20* (2013.01); *H04N 1/407* (2013.01);
(Continued)

(58) Field of Classification Search
CPC ........... G06T 5/003; G06T 5/20; G06T 5/006; G06T 2207/20008; G06T 2207/20004; H04N 1/407; H04N 5/3572; H04N 9/045
See application file for complete search history.

(56) References Cited

U.S. PATENT DOCUMENTS 4,818,865 A   4/1989  Matsui et al.
8,773,778 B2  7/2014  Sugita et al.
(Continued)

FOREIGN PATENT DOCUMENTS

CN    104010115 A    8/2014
CN    104079818 A   10/2014
(Continued)

OTHER PUBLICATIONS

Japanese Office Action, dated Nov. 9, 2018, for Japanese Application No. 2018-501711, with an English translation.
(Continued)

*Primary Examiner* — Kenny A Cese
(74) *Attorney, Agent, or Firm* — Birch, Stewart, Kolasch & Birch, LLP

(57) ABSTRACT

Provided are an image processing device, an imaging device, and an image processing method which are capable of obtaining a captured image with desired image quality. An image processing unit functioning as an image processing device includes a point image restoration processing unit that performs point image restoration processing using a restoration filter based on a point spread function of a lens unit on image data obtained from an imaging element through imaging of a subject using an imaging unit having a lens unit including a lens and the imaging element, and a determination unit that determines whether or not to perform the point image restoration processing using the point image restoration processing unit based on spherical aberration of the lens changed by an imaging condition. The point image restoration processing unit performs the point image restoration processing only in a case where the determination unit determines to perform the point image restoration processing.

17 Claims, 9 Drawing Sheets

(51) Int. Cl.
  *H04N 1/407* (2006.01)
  *H04N 5/357* (2011.01)
  *H04N 9/04* (2006.01)

(52) U.S. Cl.
  CPC .......... *H04N 5/3572* (2013.01); *H04N 9/045* (2013.01); *G06T 2207/20004* (2013.01); *G06T 2207/20008* (2013.01)

(56) References Cited

U.S. PATENT DOCUMENTS

| | | | |
|---|---|---|---|
| 2004/0070669 A1 | 4/2004 | Aoyama | |
| 2010/0079626 A1* | 4/2010 | Hatakeyama | G06T 5/006 348/241 |
| 2010/0079658 A1* | 4/2010 | Ohara | G02B 27/0025 348/340 |
| 2011/0050980 A1* | 3/2011 | Sung | G02B 27/0075 348/345 |
| 2013/0342732 A1 | 12/2013 | Yokoyama | |
| 2014/0293076 A1 | 10/2014 | Hiasa | |
| 2017/0004603 A1 | 1/2017 | Irie et al. | |
| 2017/0161883 A1* | 6/2017 | Fukuda | G06T 5/003 |

FOREIGN PATENT DOCUMENTS

| | | |
|---|---|---|
| EP | 2 221 652 A1 | 8/2010 |
| JP | 62-210414 A | 9/1987 |
| JP | 2004-48332 A | 2/2004 |
| JP | 2006-311472 A | 11/2006 |
| JP | 2006-343456 A | 12/2006 |
| JP | 2010-109625 A | 5/2010 |
| JP | 2011-199407 A | 10/2011 |
| JP | 2013-26875 A | 2/2013 |
| JP | 2014-7493 A | 1/2014 |
| JP | 2014-150423 A | 8/2014 |
| JP | 2015-4883 A | 1/2015 |
| JP | 2015-5919 A | 1/2015 |
| RU | 2005 110 559 A | 10/2006 |
| TW | 201109735 A1 | 3/2011 |
| WO | WO 2016/146380 A1 | 10/2015 |
| WO | WO-2015186511 A1 * | 12/2015 ............... G06T 5/20 |

OTHER PUBLICATIONS

International Preliminary Report on Patentability and Written Opinion of the International Searching Authority(Forms PCT/IB/326, PCT/IB/373 and PDT/ISA/237). dated Sep. 7, 2018, for corresponding International Application No. PCT/JP2017/006420, with an English translation.

International Search Report (Form PCT/ISA/210). dated Apr. 25, 2017, for corresponding International Application No. PCT/JP2017/006420, with an English translation.

Japanese Office Acton, dated Nov. 9, 2018, for Japanese Application No. 2018-501711, with an English translation.

Chinese Office Action and Search Report dated Jan. 21, 2020, for counterpart Chinese Application No. 201780010884.0 with English translation.

* cited by examiner

FIG.4

| MTF[%] | Zernike 9th [wavelength] | | | | | | | | | | |
|---|---|---|---|---|---|---|---|---|---|---|---|
| | | 0 | 0.2 | 0.4 | 0.6 | 0.8 | 1 | 2 | 3 | 4 | 5 |
| F1.4 | | 91.3 | 83.0 | 64.5 | 47.5 | 39.1 | 34.9 | 24.2 | 18.9 | 16.0 | 14.2 |
| F1.8 | | 88.8 | 86.6 | 79.8 | 71.0 | 68.0 | 65.1 | 39.8 | 30.6 | 25.7 | 22.7 |
| F2 | | 87.5 | 86.0 | 82.6 | 79.6 | 80.0 | 77.3 | 51.6 | 38.5 | 31.9 | 28.2 |
| F2.8 | | 82.6 | 82.7 | 82.5 | 82.2 | 82.2 | 81.8 | 79.3 | 74.6 | 68.9 | 62.4 |
| F4 | | 75.2 | 75.2 | 75.2 | 75.2 | 75.2 | 75.2 | 75.1 | 74.8 | 74.4 | 73.9 |
| F5.6 | | 65.5 | 65.5 | 65.5 | 65.5 | 65.6 | 65.6 | 65.6 | 65.7 | 65.8 | 65.8 |
| F8 | | 51.4 | 51.4 | 51.4 | 51.5 | 51.5 | 51.5 | 51.6 | 51.8 | 51.9 | 52.0 |
| F11 | | 34.9 | 34.9 | 34.9 | 35.0 | 35.0 | 35.0 | 35.2 | 35.3 | 35.5 | 35.7 |
| F16 | | 11.8 | 11.8 | 11.8 | 11.9 | 11.9 | 11.9 | 12.1 | 12.3 | 12.4 | 12.6 |
| F22 | | 0 | 0 | 0 | 0 | 0 | 0 | 0 | 0 | 0 | 0 |

FIG. 5

| MTF[%] | \multicolumn{11}{c}{Zernike 9th [wavelength]} |
| --- | --- | --- | --- | --- | --- | --- | --- | --- | --- | --- | --- |
| | 0 | 0.2 | 0.4 | 0.6 | 0.8 | 1 | 2 | 3 | 4 | 5 |
| F1.4 | 91.3 | 64.5 | 39.1 | 32.0 | 27.4 | 24.2 | 16.0 | 12.8 | 10.8 | 5.6 |
| F1.8 | 88.8 | 79.8 | 68.0 | 59.2 | 42.5 | 39.8 | 25.7 | 20.4 | 16.9 | 9.2 |
| F2 | 87.5 | 82.6 | 80.0 | 70.8 | 61.4 | 51.6 | 31.9 | 24.6 | 20.6 | 11.9 |
| F2.8 | 82.6 | 82.5 | 82.2 | 81.2 | 80.5 | 79.3 | 68.9 | 54.8 | 39.2 | 15.3 |
| F4 | 75.2 | 75.2 | 75.2 | 75.2 | 75.1 | 75.1 | 74.4 | 73.3 | 63.5 | 14.0 |
| F5.6 | 65.5 | 65.5 | 65.6 | 65.6 | 65.6 | 65.6 | 65.8 | 65.9 | 53.0 | 8.9 |
| F8 | 51.4 | 51.4 | 51.5 | 51.5 | 51.6 | 51.6 | 51.9 | 52.1 | 46.8 | 16.0 |
| F11 | 34.9 | 34.9 | 35.0 | 35.1 | 35.1 | 35.2 | 35.5 | 35.8 | 34.7 | 26.0 |
| F16 | 11.8 | 11.8 | 11.9 | 12.0 | 12.0 | 12.1 | 12.4 | 12.8 | 13.1 | 13.0 |
| F22 | 0 | 0 | 0 | 0 | 0 | 0 | 0 | 0 | 0 | 0 |

FIG.7

| Z9(wavelength) | MINIMUM F NUMBER AT WHICH MTF IS LESS THAN 50% (HERE, EXCEPT FOR DIFFRACTION CAUSES) | MINIMUM SPHERICAL ABERRATION RATIO AT WHICH MTF IS LESS THAN 50% (HERE, EXCEPT FOR DIFFRACTION CAUSES) |
|---|---|---|
| 0 | NONE | NONE |
| 0.2 | NONE | NONE |
| 0.4 | NONE | NONE |
| 0.6 | F1.4 | 1 |
| 0.8 | F1.4 | 1 |
| 1 | F1.4 | 1 |
| 2 | F1.8 | $(1.4/1.8)^3=0.47$ |
| 3 | F2 | $(1.4/2)^3=0.34$ |
| 4 | F2 | $(1.4/2)^3=0.34$ |
| 5 | F2 | $(1.4/2)^3=0.34$ |

POINT IMAGE RESTORATION DEVICE AND METHOD

CROSS-REFERENCE TO RELATED APPLICATIONS

The present application is a Continuation of PCT International Application No. PCT/JP2017/006420 filed on Feb. 21, 2017 claiming priority under 35 U.S.C § 119(a) to Japanese Patent Application No. 2016-036197 filed on Feb. 26, 2016. Each of the above applications is hereby expressly incorporated by reference, in their entirety, into the present application.

BACKGROUND OF THE INVENTION

1. Field of the Invention

The present invention relates to an image processing device, an imaging device, and an image processing method, and particularly, to a technology that performs restoration processing of an image captured through an imaging optical system based on a point spread function of the imaging optical system.

2. Description of the Related Art

There are some cases where a point spread phenomenon in which a point subject minutely spreads is seen on a subject image captured through an imaging optical system due to the influence of aberration and diffraction caused by the imaging optical system. A function indicating a response to a point light source of the imaging optical system is called a point spread function (PSF), and is known as characteristics for influencing resolution degradation (blur) of a captured image.

Point image restoration processing based on the PSF is performed on the captured image of which image quality is degraded due to the point spread phenomenon, and thus, it is possible to restore (recover) the image quality of the degraded captured image. The point image restoration processing is processing in which degradation characteristics (point image characteristics) caused by the aberration of the imaging optical system (lens and diaphragm) are obtained in advance and the point spreading of the captured image is canceled or reduced through image processing using a restoration filter corresponding to the point image characteristics.

In the related art, an imaging device that performs such point image restoration processing is described in JP2014-150423A.

Even in a case where aberration such as spherical aberration, coma aberration, field curvature, or astigmatism of the imaging optical system is corrected with high accuracy, the captured image obtained by the imaging device is degraded due to a diffraction phenomenon depending on an F number and the aberration is able to be enhanced by improving image forming performance of the imaging optical system. In this regard, JP2014-150423A describes the importance of correcting the degradation of the image due to the diffraction since diffraction is an unavoidable physical phenomenon.

JP2014-150423A describes that the aberration is reduced by the diaphragm at an F number of F16 or more and the influence of the diffraction becomes dominant.

Thus, the imaging device described in JP2014-150423A uses only the diffraction (so-called small diaphragm blur) occurring in a case where the F number is equal to or greater than a predetermined value (small diaphragm) as a target of the point image restoration processing, and performs the point image restoration processing of the captured image by using one restoration filter corresponding to the F number in a case where the F number at the time of imaging the captured image is equal to or greater than the predetermined value.

Since the small diaphragm blur depends on the F number and the wavelength of the light and does not depend on an image height (a position of the image), it is possible to reduce the small diaphragm blur by using one restoration filter within one image, and thus, it is possible to reduce the data amount and the operation amount.

SUMMARY OF THE INVENTION

Since the imaging device described in JP2014-150423A uses only the small diaphragm blur as the target of the point image restoration processing, it is difficult to recover the degradation of the image quality caused by the spherical aberration of the imaging optical system, particularly, high spherical aberration of light rays passing through a region near an outer edge of a pupil. Accordingly, it is necessary to use the imaging optical system which causes less degradation in the image quality caused by the spherical aberration as the imaging optical system applied to the imaging device described in JP2014-150423A, and there is a problem that the imaging optical system becomes expensive.

The present invention has been made in view of such circumstances, and an object of the present invention is to provide an image processing device, an imaging device, and an image processing method which are capable of obtaining the captured image with desired image quality.

In order to achieve the object, an image processing device according to an aspect of the present invention comprises a point image restoration processing unit that performs point image restoration processing using a restoration filter based on a point spread function of an imaging optical system on image data obtained from an imaging element through imaging of a subject using an imaging unit having the imaging optical system and the imaging element, and a determination unit that determines whether or not to perform the point image restoration processing using the point image restoration processing unit based on spherical aberration of the imaging optical system changed by an imaging condition. The point image restoration processing unit performs the point image restoration processing only in a case where the determination unit determines to perform the point image restoration processing.

The image quality of the captured image mainly depends on the spherical aberration of the imaging optical system, but the spherical aberration of the imaging optical system is changed by the imaging condition. The determination unit determines whether or not to perform the point image restoration processing using the point image restoration processing unit based on the spherical aberration of the imaging optical system changed by the imaging condition. Since the point image restoration processing unit performs the point image restoration processing only in a case where the determination unit determines to perform the point image restoration processing, it is possible to restore (recover) the degraded captured image to the captured image with the desired image quality. Since the point image restoration processing unit performs the point image restoration processing only in a case where the determination unit determines to perform the point image restoration processing, it is possible to reduce the data amount of the restoration filter used in the point image restoration processing and the operational costs of the point image restoration processing.

In the image processing device according to another aspect of the present invention, the imaging condition is an F number of a diaphragm constituting the imaging optical system. The spherical aberration of the imaging optical system is changed by the F number of the diaphragm. Accordingly, the F number of the diaphragm is one of the imaging conditions for changing the spherical aberration.

In the image processing device according to still another aspect of the present invention, it is preferable that the determination unit determines whether or not to perform the point image restoration processing using the point image restoration processing unit based on the F number of the diaphragm. The determination unit indirectly determines whether or not to perform the point image restoration processing using the point image restoration processing unit by using the F number of the diaphragm which is one of parameters for changing the spherical aberration.

In the image processing device according to still another aspect of the present invention, it is preferable that in a case where the spherical aberration of the imaging optical system changed by the imaging condition is equal to or greater than a first threshold value, the determination unit determines to perform the point image restoration processing using the point image restoration processing unit.

In the image processing device according to still another aspect of the present invention, it is preferable that in a case where a wavelength for determining the spherical aberration is $\lambda$, the first threshold value is $0.6\lambda$.

In the image processing device according to still another aspect of the present invention, it is preferable that in a case where a ratio of second spherical aberration of the imaging optical system changed by the imaging condition to first spherical aberration of the imaging optical system in a case where a diaphragm constituting the imaging optical system is an full aperture exceeds to a second threshold value, the determination unit determines to perform the point image restoration processing using the point image restoration processing unit.

In the image processing device according to still another aspect of the present invention, it is preferable that the second threshold value is 0.5.

In the image processing device according to still another aspect of the present invention, the imaging condition is a kind of a light source that illuminates the subject or a wavelength of the light source. The spherical aberration of the imaging optical system is changed by the wavelength, and thus, the kind of the light source that illuminates the subject is one of the imaging conditions for changing the spherical aberration.

In the image processing device according to still another aspect of the present invention, it is preferable that the determination unit uses the spherical aberration corresponding to the kind of the light source that illuminates the subject or the wavelength of the light source, as the spherical aberration of the imaging optical system changed by the imaging condition. The reason is that the wavelength (the wavelength of the light source specified by the kind of the light source) of the light source is one of the parameters for changing the spherical aberration.

In the image processing device according to still another aspect of the present invention, it is preferable that in a case where the diaphragm constituting the imaging optical system is at least an full aperture, the imaging optical system has the spherical aberration at which the determination unit determines to perform the point image restoration processing. The imaging optical system having spherical aberration at which the point image restoration is needed in a case where the diaphragm is the full aperture is employed as the imaging optical system. Thus, it is possible to achieve a cheap imaging optical system with high degree of freedom of optical design compared with the imaging optical system designed such that the point image restoration is not needed even in a case where the diaphragm is the full aperture.

An imaging device according to still another aspect of the present invention comprises any of the above-described image processing devices, and the imaging unit.

In the imaging device according to still another aspect of the present invention, it is preferable that the imaging device is used as an industrial camera.

An image processing method according to still another aspect of the present invention comprises a step of performing point image restoration processing using a restoration filter based on a point spread function of an imaging optical system on image data obtained from an imaging element through imaging of a subject using an imaging unit having the imaging optical system and the imaging element, and a step of determining whether or not to perform the point image restoration processing based on spherical aberration of the imaging optical system changed by an imaging condition. In the step of performing the point image restoration processing, the point image restoration processing using a restoration filter is performed only in a case where it is determined to perform the point image restoration processing in the step of determining whether or not to perform the image point restoration processing.

In the image processing method according to still another aspect of the present invention, it is preferable that the imaging condition is an F number of a diaphragm constituting the imaging optical system.

In the image processing method according to still another aspect of the present invention, it is preferable that in the step of determining whether or not to perform the point image restoration processing, it is determined to whether or not to perform the point image restoration processing based on the F number of the diaphragm.

In the image processing method according to still another aspect of the present invention, it is preferable that in a case where the spherical aberration of the imaging optical system changed by the imaging condition is equal to or greater than a first threshold value, it is determined to perform the point image restoration processing in the step of determining whether or not to perform the point image restoration processing.

In the image processing method according to still another aspect of the present invention, it is preferable that in a case where a wavelength for determining the spherical aberration is $\lambda$, the first threshold value is $0.6\lambda$.

In the image processing method according to still another aspect of the present invention, it is preferable that in a case where a ratio of second spherical aberration of the imaging optical system changed by the imaging condition to first spherical aberration of the imaging optical system in a case where a diaphragm constituting the imaging optical system is an full aperture exceeds to a second threshold value, it is determined to perform the point image restoration processing in the step of determining whether or not to perform the point image restoration processing.

In the image processing method according to still another aspect of the present invention, it is preferable that the second threshold value is 0.5.

According to the present invention, since it is determined whether or not to perform the point image restoration processing based on the spherical aberration of the imaging optical system changed by the imaging condition and the point image restoration processing is performed only in a case where it is determined to perform the point image restoration processing, it is possible to restore (recover) the degraded captured image to the captured image with the desired image quality. In a case where it is determined not to perform the point image restoration processing, since the captured image with the desired image quality is obtained and the point image restoration processing is not performed, it is possible to reduce the data amount of the restoration filter used in the point image restoration processing and the operational costs of the point image restoration processing.

BRIEF DESCRIPTION OF THE DRAWINGS

FIG. 4 is a chart showing an example of an MTF calculated for each combination of spherical aberration and an F number.

FIG. 5 is a chart showing another example showing the MTF calculated for each combination of the spherical aberration and the F number.

FIG. 7 is a chart showing a calculation result of the spherical aberration ratio calculated for each lens having different spherical aberration shown in FIG. 4.

DESCRIPTION OF THE PREFERRED EMBODIMENTS

Hereinafter, embodiments of an image processing device, an imaging device, and an image processing method according to the present invention will be described with reference to the accompanying drawings. In the following embodiments, an example in which the present invention is applied to an imaging device used in a machine vision system will be described.

Figure 1:
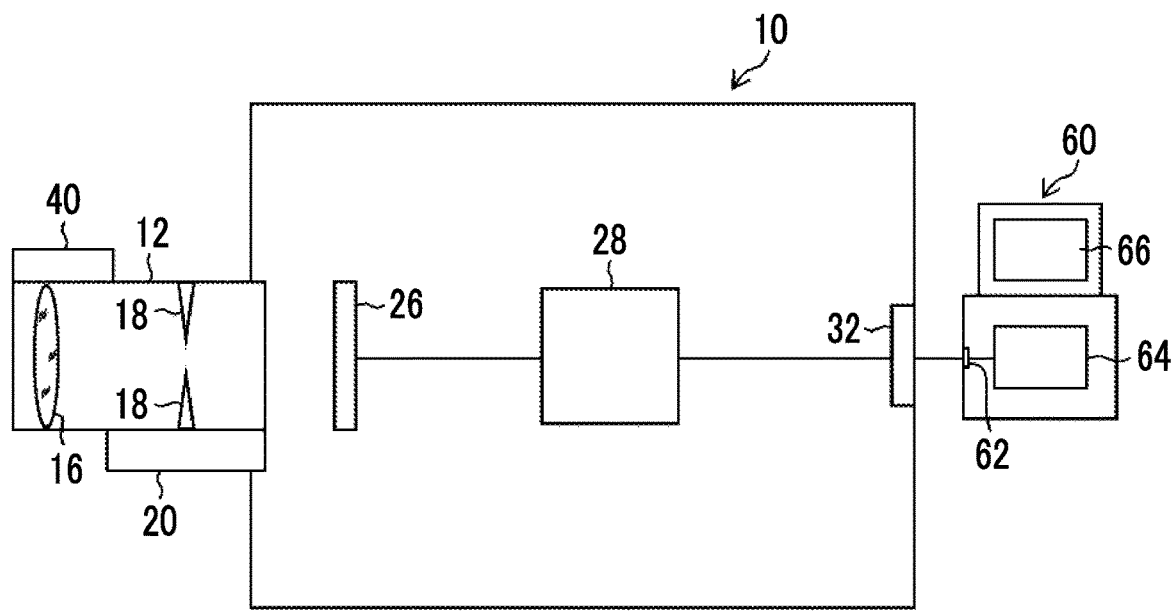
FIG. 1 is a block diagram showing a functional configuration example of an imaging device connected to a computer.

FIG. 1 is a block diagram showing a functional configuration example of an imaging device 10 connected to a computer (PC: personal computer).

An industrial camera needs to image an image on which a target range is in focus with high speed by decreasing an F number of a diaphragm while increasing depth of field, and hardly uses the F number at which small diaphragm blur may occur like a general camera lens.

The imaging device 10 shown in FIG. 1 is an industrial camera used in the machine vision system, and mainly includes a lens unit 12 and an imaging element 26 which constitute an imaging unit, a camera controller 28, an input and output interface 32, and an illumination device 40.

The lens unit 12 includes an imaging optical system that includes a lens 16 and a diaphragm 18, and an optical system operating unit 20 that controls the imaging optical system. The optical system operating unit 20 includes a manual operating unit that adjusts a focus position of the lens 16, and a diaphragm driving unit that drives the diaphragm 18 in response to a control signal applied from the camera controller 28.

It is important that lens performance such as resolution and brightness is homogeneous in a plane for the lens of the imaging device used in the machine vision system. An F number of the diaphragm is restricted as design means for realizing the in-plane lens performance, but the brightness of the lens is needed as a lens specification.

Meanwhile, it is common for the imaging device used in the machine vision system to use a diaphragm having a mid-range (a diaphragm having an F number range which is larger than an F number of an full aperture and is smaller than an F number of a small diaphragm at which small diaphragm blur occurs) as a range of the diaphragm for practical use due to the necessity of a depth of field.

Accordingly, the lens 16 of the imaging device 10 is preferentially designed such that a captured image with desired image quality needed in the inspection, measurement, or positioning of a product is able to be obtained under a predetermined imaging condition (including the F number of the diaphragm for practical use) on the preferential basis. The image quality of the captured image obtained by using the lens 16 is degraded under an imaging condition other than the predetermined imaging condition, and does not satisfy the desired image quality (becomes the degraded captured image). However, it is possible to restore (recover) the degraded captured image through point image restoration processing to be described below. A focal length (f) of the lens 16 of the present example is f=16 mm.

The diaphragm 18 includes a plurality of diaphragm leaf blades, and is controlled at ten steps from F1.4 (maximum F number) to F22 in one-AV (aperture value) increments.

The imaging element 26 is a complementary metal-oxide semiconductor (CMOS) type image sensor. The imaging element 26 is not limited to the CMOS type, and may be an XY address type or charge coupled device (CCD) type image sensor. A sampling frequency (fs) of the imaging element 26 of the present example is 90 samples/mm.

The illumination device 40 illuminates a subject in a region in which imaging is performed by the imaging device 10, and includes, for example, a plurality of light sources such as a mercury lamp, an infrared light source, and RGB light sources of red (R), green (G), and blue (B). The illumination device illuminates the subject with illumination light having a desired wavelength by selecting the kind of the light source that emits light. In the present example, the illumination device 40 can emit light by appropriately selecting light having a spectrum (wavelength $\lambda$=546.070 nm) of e lines as a peak wavelength by turning on the mercury lamp or infrared light having a wavelength (1092.14 nm) which is two times the wavelength of the e lines as a peak wavelength by turning on the infrared light source. It is possible to emit light having a desired peak wavelength by turning one light source selected from the RGB light sources or a light source appropriately combined from the RGB light sources.

Figure 2:
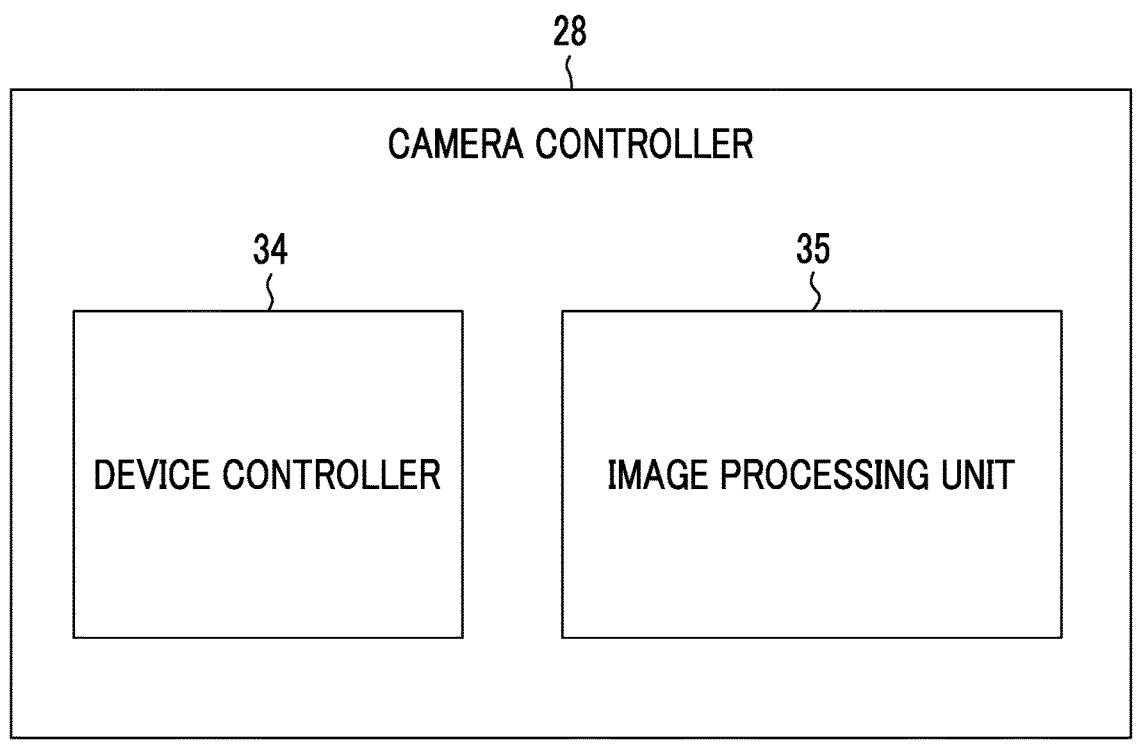
FIG. 2 is a block diagram showing a configuration example of a camera controller shown in FIG. 1.

Although the details will be described below, the camera controller 28 has a function of a device controller 34 that generally controls the units of the imaging device 10 and a function of an image processing unit (image processing device) 35 that performs image processing on image data sent from the imaging element 26, as shown in FIG. 2.

Image data on which the image processing is performed by the camera controller 28 is sent to a computer 60 or the like through the input and output interface 32. A format of the image data output from the camera controller 28 is not particularly limited, and may be a format such as the Moving Picture Experts Group (MPEG) or an H.264 in the case of a motion picture and a format such as the Joint Photographic Experts Group (JPEG) or Tagged Image File Format (TIFF) in the case of a still image. Raw data on which the image processing is not performed by the image processing unit 35 may be output. The camera controller 28 may generate one image file like a so-called Exchangeable image file format (Exif) by associating a plurality of relevant data items such as header information (imaging date and time, camera model, number of pixels, F number, kind of light source, or the like), main image data, and thumbnail image data with each other, and may output the image file.

The computer 60 is a portion constituting a part of the machine vision system that inspects various products. The computer is connected to the imaging device 10 through the input and output interface 32 of the imaging device 10 and a computer input and output unit 62, and receives data items such as the image data sent from the imaging device 10. A computer controller 64 generally controls the computer 60, performs the image processing on the image data from the imaging device 10, inspects the captured product, and controls communication with various devices (not shown) such as an industrial robot connected via a network.

The computer 60 has a display 66, and displays the processing content and inspection result in the computer controller 64 on the display 66 if necessary. A user can input data or a command to the computer controller 64 by operating input means (not shown) such as a keyboard while checking the display of the display 66. Accordingly, the user can control the computer 60 or the imaging device 10 connected to the computer 60.

The controllers (camera controller 28 and computer controller 64) each have circuits needed in control processing, and includes, for example, a central processing unit (CPU).

[Image Processing Device]

<First Embodiment of Image Processing Unit>

Figure 3:
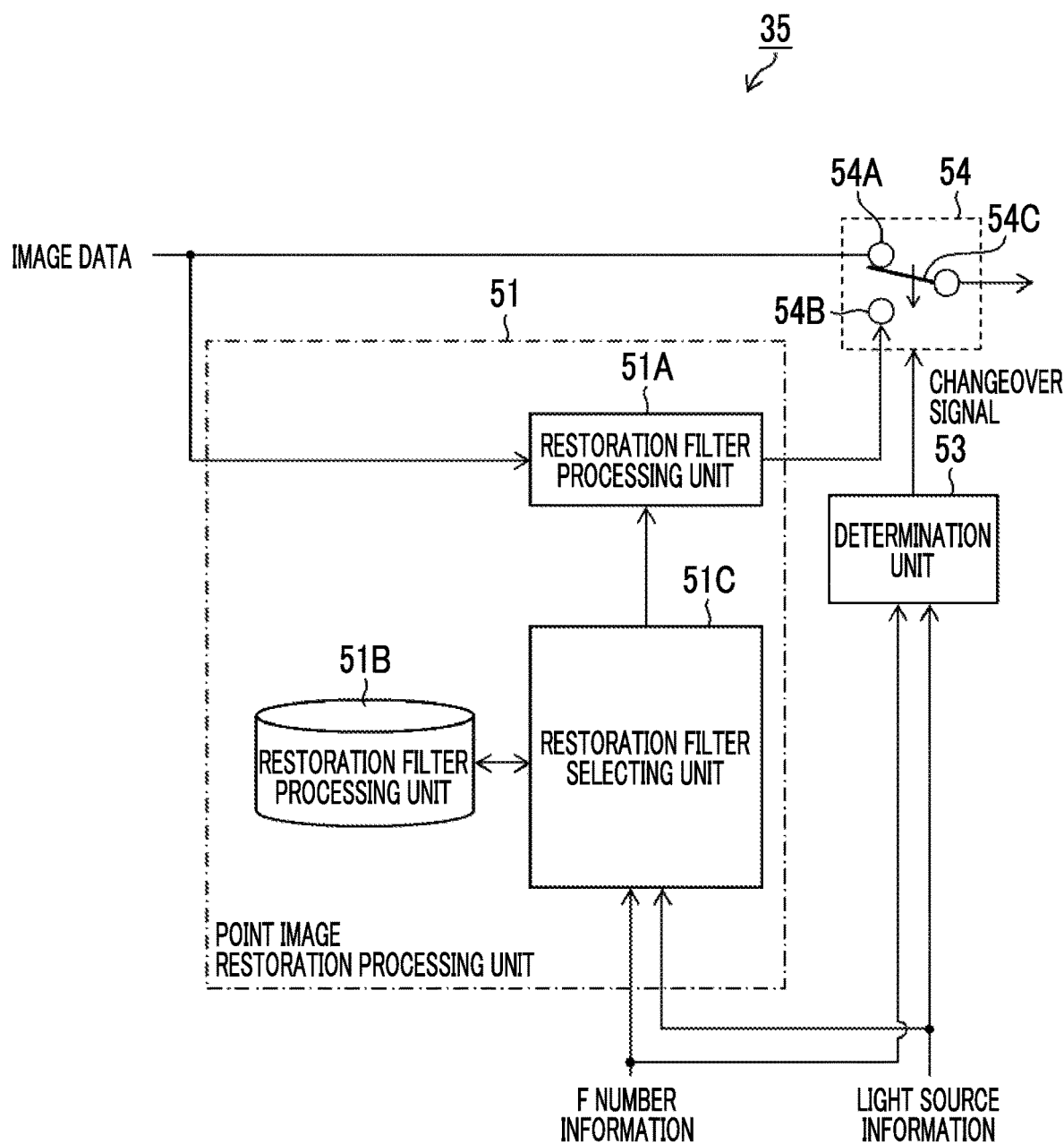
FIG. 3 is a block diagram showing a first embodiment of an image processing unit in the camera controller shown in FIG. 2.

FIG. 3 is a block diagram showing a first embodiment of the image processing unit 35 within the camera controller 28 shown in FIG. 2.

The image processing unit 35 shown in FIG. 3 mainly includes a point image restoration processing unit 51, a determination unit 53, and a changeover unit (changeover switch) 54. The image processing unit 35 includes various processing units of an offset processing, gradation correction processing, and outline emphasis processing in addition to the point image restoration processing unit 51, but these processing units are not shown in FIG. 3.

Image data which is read out from the imaging element 26 (FIG. 1) and is converted into a digital signal is applied to a first input 54A of the changeover switch 54 and the point image restoration processing unit 51 (restoration filter processing unit 51A).

The point image restoration processing unit 51 mainly includes the restoration filter processing unit 51A, a restoration filter storage unit 51B, and a restoration filter selecting unit 51C.

Image data on which restoration processing is not performed yet, that is, image data of a captured image of which image quality is degraded due to spherical aberration of the lens 16 is applied to one input of the restoration filter processing unit 51A, and a restoration filter which is appropriately selected from a plurality of restoration filters stored in the restoration filter storage unit 51B by the restoration filter selecting unit 51C is applied to the other input.

The restoration filter processing unit 51A performs the point image restoration processing using the restoration filter applied by the restoration filter selecting unit 51C on the input image data, and calculates the image data on which the point image restoration processing is performed. That is, the restoration filter processing unit 51A calculates image data obtained by performing the point image restoration processing by performing a convolution operation of image data having a predetermined kernel size (which is the same kernel size as that of the restoration filter, and is, for example, 7×7) with a processing target pixel of the input image data as a center and the restoration filter.

The image data on which the point image restoration processing is performed by the restoration filter processing unit 51A is applied to a second input 54B of the changeover switch 54.

The determination unit 53 is a portion that determines whether or not it is necessary to perform the point image restoration processing on the input image data by the point image restoration processing unit 51. In a case where it is determined that it is necessary to perform the point image restoration processing, the determination unit is a portion that outputs a changeover signal (for example, a high-level signal) for changing a movable portion 54C of the changeover switch 54 to the second input 54B. In a case where it is determined that it is not necessary to perform the point image restoration processing, the determination unit outputs a changeover signal (for example, a low-level signal) for changing the movable portion 54C of the changeover switch 54 to the first input 54A. The details of the determination unit 53 will be described below.

[Restoration Filter]

Next, the restoration filter stored in the restoration filter storage unit 51B will be described.

In general, a convolution type Wiener filter can be used in the restoration of a blurred image using a point spread function (PSF) indicating a response to a point light source of the imaging optical system (lens 16 and diaphragm 18). Frequency characteristics $d(\omega_x, \omega_y)$ of the restoration filter can be calculated by the following expression while referring to information of signal-to-noise ratio (SNR) and the optical transfer function (OTF) obtained by performing the Fourier transform on PSF(x, y).

$$d(\omega_x, \omega_y) = \frac{H^*(\omega_x, \omega_y)}{\|H(\omega_x, \omega_y)\|^2 + 1/SNR(\omega_x, \omega_y)} \quad \text{[Expression 1]}$$

Here, $H(\omega_x, \omega_y)$ represents the OTF, and $H^*(\omega_x, \omega_y)$ represents the complex conjugate thereof. $SNR(\omega_x, \omega_y)$ represents a signal-to-noise ratio.

The design of a filter coefficient of the restoration filter has an optimization problem that a coefficient value is selected such that the frequency characteristics of the filter become closest to desired Wiener frequency characteristics, and the filter coefficient can be appropriately calculated through any known method.

Since the PSF is changed by the imaging condition such as an F number, a wavelength (peak wavelength) of illumination light, an image height, and a focal length, it is necessary to calculate the restoration filter by using the PSF changed by the imaging condition. The restoration filter may be calculated by using the modulation transfer function (MTF) indicating an amplitude component of the OTF instead of the OTF.

A plurality of restoration filters calculated depending on PSFs corresponding to a plurality of imaging conditions is stored in association with the imaging conditions in the restoration filter storage unit 51B. Although the restoration filter storage unit 51B of the present example stores the restoration filter corresponding to the F number of the diaphragm 18 and the kind of the light source of the illumination device 40 or the wavelength (peak wavelength) of the light source, the present invention is not limited thereto. The restoration filter corresponding to the image height may be generated and stored.

Information (F number information) indicating a current F number of the diaphragm 18 and information (light source information) indicating the kind of the light source used at the time of imaging, among the plurality of light sources used by the illumination device 40, are applied to the restoration filter selecting unit 51C from the camera controller 28 (FIG. 1), and the restoration filter selecting unit 51C reads out the restoration filter corresponding to the F number information and the light source information from the restoration filter storage unit 51B based on the F number information and the light source information input from the camera controller 28, and outputs the readout restoration filter to the restoration filter processing unit 51A. The light source information is not limited to the information indicating the kind of the light source used at the time of imaging, and may be information indicating the wavelength (peak wavelength) of the light source used at the time of imaging.

The F number information and the light source information are applied to the determination unit 53 from the camera controller 28. The determination unit 53 determines whether or not it is necessary to perform the point image restoration processing using the point image restoration processing unit 51 on the input image data based on the F number information and the light source information, and outputs a changeover signal corresponding to the determination result to the changeover switch 54 as described above.

Next, the detailed determination method of whether or not it is necessary to perform the point image restoration processing on the captured image data will be described.

Resolution degradation (blur) of the captured image depends on the point spread function (PSF) of the lens, and the PSF mainly depends on the spherical aberration of the lens.

The Zernike polynomial using polar coordinates is used as a polynomial that approximates a wavefront aberration of the imaging optical system, and the ninth term of the Zernike polynomial (Frits Zernike polynomial) represents the spherical aberration.

The spherical aberration expressed by the ninth term of the Frits Zernike polynomial and the MTF for each F number were calculated for various lenses having different spherical aberrations by using the lens having a focal length f of 16 mm and using the mercury lamp using the spectrum (wavelength $\lambda=546.070$ nm) of the e lines as the peak wavelength as an illumination light source.

The sampling frequency (fs) of the imaging element 26 is 90 samples/mm, and the MTF is a value of a predetermined spatial frequency (0.25 fs in the present example) in a range of 0.25 fs to 0.3 fs. The reason why the MTF in the spatial frequency in the range of 0.25 fs to 0.3 fs is used as an evaluation target is that the MTF in the spatial frequency in such a range is suitable to evaluate image quality and is a spatial frequency domain in which the point image restoration processing contributes to the image quality.

FIG. 4 is a chart showing an example of the MTF calculated for each combination of the spherical aberration and the F number.

FIG. 4 shows the MTF for each combination of ten kinds of lenses having spherical aberrations of $0\lambda$, $0.2\lambda$, ..., and $5\lambda$ and the F numbers having ten steps of F1.4 to F22.

Here, the MTF shown in FIG. 4 is a value in the predetermined spatial frequency (0.25 fs) on an optical axis and is the MTF in a predetermined region on an imaging screen of the imaging element 26, but may be a value in the other region.

The MTF in the predetermined region may be the MTF in a region in which the image height on the imaging screen is equal to or greater than 50% (50% in a case where a distance from the center of the imaging screen to the four corners of the imaging screen) is 100%). In general, the reason is that since the MTF generally becomes smaller as the image height becomes higher, the MTF in this region is preferably employed.

As another example of the MTF in the predetermined region, the MTF on the entire screen of the imaging screen may be employed, or MTFs at a plurality of optional points on the imaging screen may be employed.

A representative value (for example, average value, median value, or mode) of the MTF in the predetermined region is used as the MTF in the predetermined region.

As shown in FIG. 4, F1.4 is the maximum F number. The MTF becomes larger as the F number becomes larger from the maximum F number (diaphragm opening becomes smaller), and the MTF becomes gradually smaller in a case where the F number is equal to or greater than F5.6. The reason why the MTF becomes gradually smaller in a case where the F number is equal to or greater than F5.6 is that the small diaphragm blur is more dominant than the spherical aberration. Since the MTF is too small at F22, the MTF is not able to be correctly calculated, and thus, the MTF is set as 0.

FIG. 5 is a chart showing another example showing the MTF calculated for each combination of the spherical aberration and the F number. The MTF shown in FIG. 5 is shown for a case where only the kind of the light source is different from that in the example shown in FIG. 4, and a case where the infrared light source having a wavelength (1092.14 nm) which is two times the wavelength of the e lines shown in FIG. 4 as the peak wavelength is used as the light source of the illumination light is illustrated.

In a case where the wavelength of the light source is different, a refractive index of the lens is different, and thus, the MTF is also different. As can be seen from the comparison of the MTF shown in FIG. 4 with the MTF shown in FIG. 5, in a case where the infrared light having the wavelength which is two times the wavelength of the e lines is used as the light source at the time of imaging, the MTF is reduced compared with a case where the mercury lamp is used as the light source and the light having the wavelength of the e lines as the peak wavelength is used. That is, the spherical aberration is different by a wavelength for determining the spherical aberration, and the longer the wavelength, the higher the spherical aberration.

The imaging device 10 used in the machine vision system uses the range of the diaphragm for practical use due to the necessity of the depth of field, as the diaphragm having the mid-range, and the lens 16 is designed such that the captured image with the desired image quality needed in the inspection of the product is able to be obtained on the preferential basis in the diaphragm having the mid-range even though the point image restoration processing is not performed.

Meanwhile, since the brightness of the lens is needed as the lens specification, it is necessary to obtain the captured image with the desired image quality needed in the inspection of the product even in the full aperture, and the degraded captured image is recovered through the point image restoration processing in this case.

Although the lens 16 of the present example is designed such that the spherical aberration is 2λ, the present invention is not limited thereto. As the lens has high spherical aberration, the lens is easily designed, and thus, the lens becomes cheap.

The determination unit 53 determines whether or not to perform the point image restoration processing using the point image restoration processing unit 51 based on the spherical aberration of the imaging optical system changed depending on the imaging condition (F number and wavelength of light source). The reason is that since the PSF depends on the spherical aberration and the MTF indicating the amplitude component of the OTF obtained by performing the Fourier transform on the PSF also depends on the spherical aberration, the determination unit can determine the resolution degradation (blur) of the captured image based on the spherical aberration.

Figure 6:
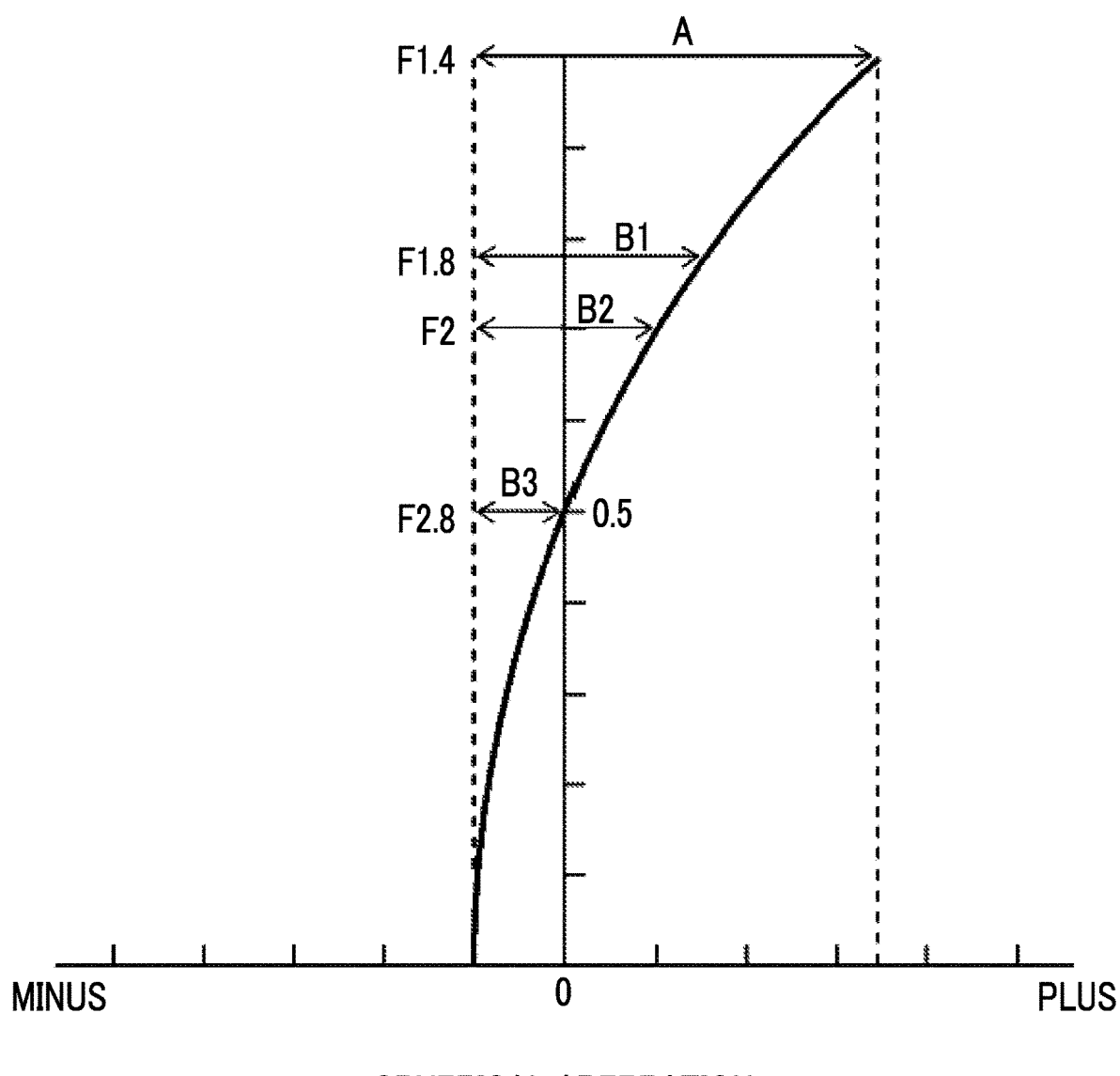
FIG. 6 is a longitudinal aberration diagram showing the spherical aberration of the lens.

FIG. 6 is a longitudinal aberration diagram showing the spherical aberration of a certain lens, and is shown as a graph of which a horizontal axis represents a position in which a light ray crosses an optical axis and a vertical axis represents a height at which the light ray is incident on the imaging optical system. An origin O of the graph is a paraxial image point for a wavelength for determining the spherical aberration, and a side apart from the lens on the horizontal axis is assigned a plus symbol.

In the present example, the spherical aberration of the lens is an amount defined by a difference between an image surface position (a position corresponding to a diaphragm diameter of 0) of the paraxial and an image surface position of the light ray passing through the most edge side of an opening of an full aperture, and is evaluated by the sum of a maximum deviation (aberration amount) in a positive direction and a maximum deviation (aberration amount) in a minus direction in FIG. 6. In FIG. 6, the spherical aberration (aberration amount) is expressed by A in a case where the F number is F1.4 (maximum F number), and the spherical aberrations (aberration amounts) in a case where the F number is F1.8, F2, and F2.8 are respectively expressed by B1, B2, and B3. That is, the spherical aberration becomes maximum in a case where the F number is F1.4 (maximum F number), and becomes smaller as the F number is increased from the maximum F number.

In a case where the spherical aberration changed by the F number to be used is equal to or greater than a first threshold value (0.6λ in a case where the wavelength for determining the spherical aberration is λ in the present example), the determination unit 53 determines to perform the point image restoration processing using the point image restoration processing unit 51. The reason why the first threshold value is set to 0.6λ is that the lens of F1.4 has spherical aberration of 0.6λ or more under a condition in which the MTF is less than 50% on an open side in a case where the MTF is evaluated by using assuming the spherical aberration expressed by the ninth term of the Frits Zernike polynomial, setting the sampling frequency (fs) of the imaging element 26 to 90 samples/mm, and using the mercury lamp having the spectrum (wavelength λ=546.070 nm) of the e lines as the peak wavelength as the illumination light source as shown in FIG. 4. The MTF of 50% is a threshold value of whether or not the image data satisfies the desired image quality needed in the inspection of the product.

As shown in FIG. 4, in a case where the lens 16 has spherical aberration of 2λ at the maximum F number (F1.4) and the illumination light emitted from the illumination device 40 is light having the spectrum of the e lines as the peak wavelength, if the F number of the diaphragm 18 is F2, the spherical aberration is less than 0.6λ, and the MTF satisfies 50%.

In a case where the F number of the diaphragm 18 is equal to or greater than F2 under such a condition, since the spherical aberration less than 0.6λ and the MTF satisfies 50% (except for the decrease in the MTF due to the diffraction caused by the small diaphragm), the determination unit 53 determines not to perform the point image restoration processing in a case where the F number is equal to or greater than F2.

That is, the determination unit 53 can perform determination by using the F number instead of determining whether or not the point image restoration processing using the point image restoration processing unit 51 based on the spherical aberration changed by the imaging condition (F number and wavelength of light source). In the present example, the determination unit determines not to perform the point image restoration processing in a case where the F number is equal to or greater than F2.0, and determines to perform the point image restoration processing in a case where the F number is less than F2.0. In the example shown in FIG. 4, since a case where the MTF is less than 50% at F11 or more is caused by not the spherical aberration but the small diaphragm blur, this case is not considered in the present determination.

In a case where a ratio (spherical aberration ratio) of the spherical aberration (second spherical aberration) of the imaging optical system changed by the imaging condition to the spherical aberration (first spherical aberration) of the imaging optical system in a case where the diaphragm 18 is the full aperture (F1.4) exceeds 0.5, the determination unit 53 may determine to perform the point image restoration processing using the point image restoration processing unit 51.

As shown in FIG. 6, in a case where the first spherical aberration of the imaging optical system in the full aperture (F1.4) is A and the second spherical aberrations corresponding to the F numbers (F1.8, F2, F2.8, ...) to be used at the time of imaging are B1, B2, B3, ..., the spherical aberration ratios may be expressed by B1/A, B2/A, B3/A, ....

In a case where the spherical aberration ratio capable of being obtained by the F number to be used at the time of imaging exceeds the threshold value (second threshold value (0.5 in the present example)), the MTF is less than 50%, and thus, the determination unit 53 can determine to perform the point image restoration processing using the point image restoration processing unit 51.

Next, the second threshold value of the spherical aberration ratio as the determination reference of whether or not the MTF is less than 50% will be described.

The ninth term of the Zernike polynomial (Frits Zernike polynomial) representing the spherical aberration is expressed by the following expression.

$$R(\rho,\theta)=6\rho^4-6\rho^2+1 \qquad \text{[Expression 2]}$$

In [Expression 2], ρ represents a radius, and θ represents an angle of rotation.

Since the spherical aberration can approximate by the differentiation of the wavefront aberration, f is a focal length, and the spherical aberration can be expressed by the following expression.

$$Zdp(\rho) = f(24\rho^3 - 12\rho) \qquad \text{[Expression 3]}$$

In a case where the F number at the time of opening the diaphragm is $F_0$ and the F number at the time of imaging is F, a pupil diameter $L_0$ at the time of opening can be expressed by $L_0 = f/F_0$, and a pupil diameter L at the time of imaging can be expressed by $L = f/F$.

In a case where a ratio between the pupil diameters is T, the ratio T between the pupil diameters can be expressed by the following expression.

$$T = \frac{Zdp(L)}{Zdp(L_0)} \qquad \text{[Expression 4]}$$

In a case where c is a constant depending on the focal length and [Expression 3] approximates, the spherical aberration can be expressed by the following expression.

$$Zdp(\rho) \approx c \times \rho^3 \qquad \text{[Expression 5]}$$

Accordingly, the following expression is established by [Expression 4] and [Expression 5].

$$T = (F_0/F)^3 \qquad \text{[Expression 6]}$$

or $$F = \frac{F_0}{\sqrt[3]{T}}$$

That is, a case where the MTF is prescribed using the ratio (spherical aberration ratio) between the spherical aberrations in the ninth term of the Zernike polynomial is equivalent to a case where the MTF is prescribed using the F number.

As stated above, T (the spherical aberration ratio which is the ratio between the spherical aberration at the maximum F number and the spherical aberration at the F number at the time of imaging) at which the MTF is less than 50% is calculated for each lens having different spherical aberration shown in FIG. 4. The minimum spherical aberration ratio among the spherical aberration ratios at which the MTF is less than 50% is calculated for each lens. The MTF due to the diffraction caused by the small diaphragm is decreased, and is calculated except for the F number at which the MTF is less than 50%.

FIG. 7 is a chart showing the calculation result of the spherical aberration ratio calculated for each lens having different spherical aberration shown in FIG. 4.

In a case where the MTF is evaluated by setting the sampling frequency (fs) of the imaging element 26 to 90 samples/mm and using the mercury lamp having the spectrum (wavelength λ=546.070 nm) of the e lines as the peak wavelength as the illumination light source as shown in FIG. 7, the spherical aberration ratio of the lens having spherical aberration of 2λ at the maximum F number is 0.47 in a case where the MTF is less than 50%.

Accordingly, 0.5 obtained by rounding off the second decimal place of 0.47 is employed as the second threshold value of the spherical aberration ratio as the determination reference of whether or not the MTF is less than 50%.

In the case of the lens 16 of the present example designed such that the spherical aberration is 2λ, in a case where the light source having the spectrum of the e lines as the peak wavelength is used and the F number is reduced to F2, the MTF is equal to or greater than the threshold value of 50%. However, in a case where the infrared light source that emits the infrared light having the wavelength which is two times the wavelength of the e lines is used, since the MTF is not equal to or greater than the threshold value of 50% even though the F number is changed to F2, it is necessary to change the F number to F2.8 or more.

Accordingly, in a case where the determination unit 53 determines whether or not to perform the point image restoration processing based on the spherical aberration of the imaging optical system changed by the imaging condition and the first threshold value or determines whether or not to perform the point image restoration processing based on the spherical aberration ratio between the spherical aberration (first spherical aberration) in the full aperture and the spherical aberration (second spherical aberration) of the imaging optical system changed by the imaging condition and the second threshold value, it is preferable that the first threshold value or the second threshold value set depending on the wavelength (that is, the kind of the light source of the illumination light emitted from the illumination device 40 (or the wavelength of the light source)) for determining the spherical aberration is used. In a case where the determination unit determines whether or not to perform the point image restoration processing by using the F number at the time of imaging, it is preferable that the F number (threshold value) as the determination reference is also set depending on the wavelength for determining the spherical aberration.

<Second Embodiment of Image Processing Unit>

Figure 8:
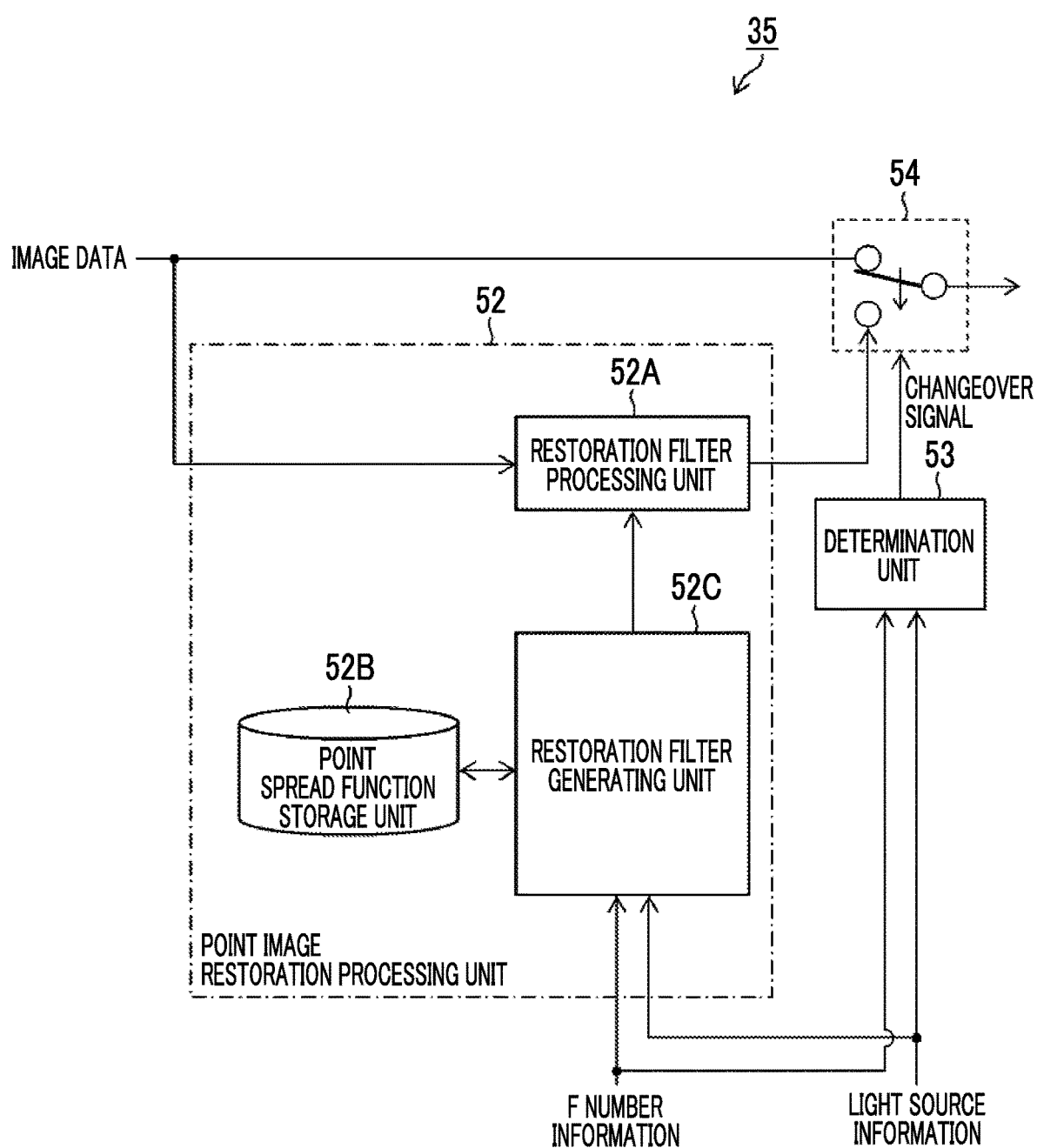
FIG. 8 is a block diagram showing a second embodiment of the image processing unit in the camera controller shown in FIG. 2.

FIG. 8 is a block diagram showing a second embodiment of the image processing unit 35 in the camera controller 28 shown in FIG. 2. Portions in common with those in the first embodiment shown in FIG. 3 will be assigned the same references, and the detailed description thereof will be omitted.

The image processing unit 35 of the second embodiment shown in FIG. 8 mainly includes a point image restoration processing unit 52, a determination unit 53, and a change-over switch 54.

The point image restoration processing unit 52 is different from the point image restoration processing unit 51 of the image processing unit 35 of the first embodiment in that a point spread function storage unit 52B and a restoration filter generating unit 52C are provided instead of the restoration filter storage unit 51B and the restoration filter selecting unit 51C of the point image restoration processing unit 51.

The restoration filter storage unit 51B of the point image restoration processing unit 51 stores the plurality of restoration filters corresponding to the imaging conditions such as the F number, whereas the point spread function storage unit 52B stores the point spread function (PSF) representing the response to the point light source of the imaging optical system (lens 16 and diaphragm 18) which is a source for generating the plurality of restoration filters. The restoration filter storage unit 51B may store the PSF corresponding to the imaging condition only under the imaging condition in which the determination unit determines to perform the point image restoration processing, and thus, the data amount of the PSF to be stored can be reduced.

The F number information indicating the current F number of the diaphragm 18 and the light source information indicating the kind of the light source used at the time of imaging, among the plurality of light sources used by the illumination device 40, are applied to the restoration filter generating unit 52C from the camera controller 28 (FIG. 1), and the restoration filter generating unit 52C reads out the PSF corresponding to these information items from the point spread function storage unit 52B based on the F number information and the light source information input from the camera controller 28, and generates the restoration filter based on the readout PSF.

That is, the restoration filter generating unit 52C obtains the frequency characteristics $d(\omega x, \omega y)$ of the restoration filter as represented, for example, by [Expression 1] based on the OTF obtained by performing the Fourier transform on the readout PSF and the preset SNR, and generates the convolution type Wiener filter (restoration filter) by performing the inverse Fourier transform on the frequency characteristics.

The restoration filter created in this manner is applied to the restoration filter processing unit 52A, and the convolution operation of the image data and the restoration filter is performed.

Although the point spread function storage unit 52B stores the PSF, the point spread function storage unit may store the OTF obtained by performing the Fourier transform on the PSF or the MTF indicating the amplitude component of the OTF instead of the PSF.

[Image Processing Method]

<First Embodiment of Image Processing Method>

Next, a first embodiment of an image processing method according to the present invention will be described according to a flowchart shown in FIG. 9.

Figure 9:
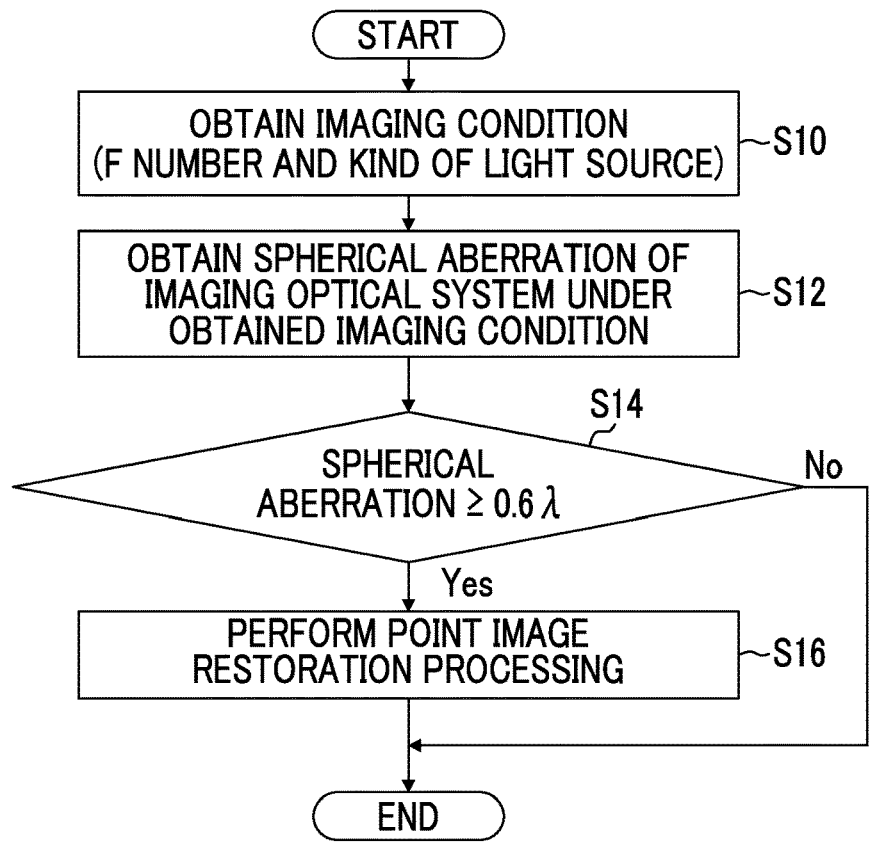
FIG. 9 is a flowchart showing a first embodiment of an image processing method.

In FIG. 9, the determination unit 53 (FIGS. 3 and 8) of the image processing unit 35 obtains the imaging condition (the F number information indicating the current F number of the diaphragm 18 and the light source information indicating the kind of the light source used at the time of imaging, among the plurality of light sources of the illumination device 40) from the camera controller 28 (step S10).

Subsequently, the determination unit 53 obtains the spherical aberration of the imaging optical system (lens 16 and diaphragm 18) corresponding to the obtained imaging condition (step S12). For example, the determination unit 53 has a storage unit that stores the spherical aberration for each kind (wavelength $\lambda=546.070$ nm or $\lambda=1092.14$ nm) of the light source used at the time of imaging as shown in FIGS. 4 and 5 and for each F number corresponding to the spherical aberration ($2\lambda$) of the lens 16 of the present example, and obtains the spherical aberration by reading out the spherical aberration corresponding to the current imaging condition from the storage unit.

The determination unit 53 determines whether or not the spherical aberration obtained as stated above is equal to or greater than the first threshold value ($0.6\lambda$), and determines to perform the point image restoration processing using the point image restoration processing unit 51 or 52 (FIG. 3 or 8) in a case where the spherical aberration is equal to or greater than $0.6\lambda$ (in the case of "Yes"). The processing proceeds to step S16 (step S14). That is, in a case where the determination unit 53 determines to perform the point image restoration processing, the determination unit causes the point image restoration processing unit 51 or 52 to be operable, and outputs the changeover signal for changing the movable portion 54C of the changeover switch 54 to the second input 54B.

In step S16, the point image restoration processing unit 51 or 52 performs the point image restoration processing only in a case where the determination unit 53 determines to perform the point image restoration processing, and outputs the image data obtained by performing the point image restoration processing to the second input 54B of the changeover switch 54. Accordingly, the image data on which the point image restoration processing is performed is output through the changeover switch 54.

Meanwhile, in a case where the obtained spherical aberration is less than the first threshold value ($0.6\lambda$) (in the case of "No"), the determination unit 53 determines not to perform the point image restoration processing using the point image restoration processing unit 51 or 52, and the present processing is ended (step S14). In this case, the determination unit 53 outputs the changeover signal for changing the movable portion 54C of the changeover switch 54 to the first input 54A, and outputs unprocessed image data on which the point image restoration processing is not performed, which is input to the first input 54A, through the changeover switch 54. In a case where the determination unit 53 determines not to perform the point image restoration processing, it is preferable that the determination unit causes the point image restoration processing unit 51 to 52 to be inoperable and the operational costs can be reduced.

<Second Embodiment of Image Processing Method>

Figure 10:
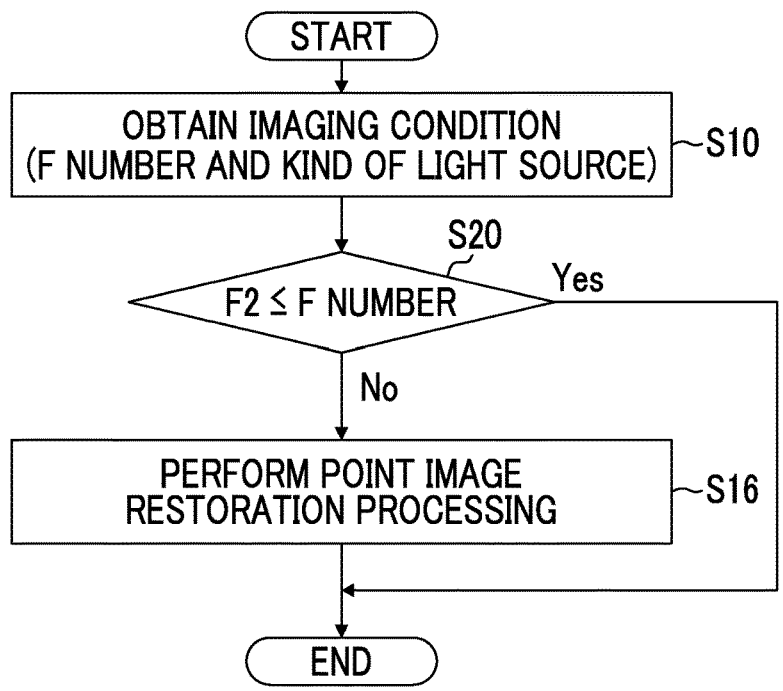
FIG. 10 is a flowchart showing a second embodiment of the image processing method.

FIG. 10 is a flowchart showing a second embodiment of the image processing method according to the present invention. In FIG. 10, steps in common with those in the first embodiment shown in FIG. 9 will be assigned the same step numbers, and the detailed description thereof will be omitted.

Although it has been described in the first embodiment that the determination unit determines whether or not to perform the point image restoration processing based on the magnitude of the spherical aberration, the second embodiment shown in FIG. 10 is different from the first embodiment in that the determination unit determines whether or not to perform the point image restoration processing based on the F number obtained in step S10 instead of the spherical aberration.

That is, the determination unit 53 of the second embodiment determines whether or not the F number obtained in step S10 is equal to or greater than F2, and determines not to perform the point image restoration processing in a case where the F number is equal to or greater than F2 (in the case of "Yes"). The present processing is ended (step S20).

Meanwhile, in a case where the F number obtained in step S10 is less than F2 (in the case of "No"), the determination unit 53 determines to perform the point image restoration processing. The processing proceeds to step S16 (step S20).

The F number determined in step S20 corresponds to a case where the kind of the light source is the mercury lamp (wavelength $\lambda=546.070$ nm) (see the F number corresponding to the spherical aberration of $2\lambda$ in FIG. 4). In a case where the kind of the light source is the infrared light source (wavelength $\lambda=1092.14$ nm), F2.8 is used as the threshold value instead of F2 in step S20 (see the F number corresponding to the spherical aberration of $2\lambda$ in FIG. 5).

<Third Embodiment of Image Processing Method>

Figure 11:
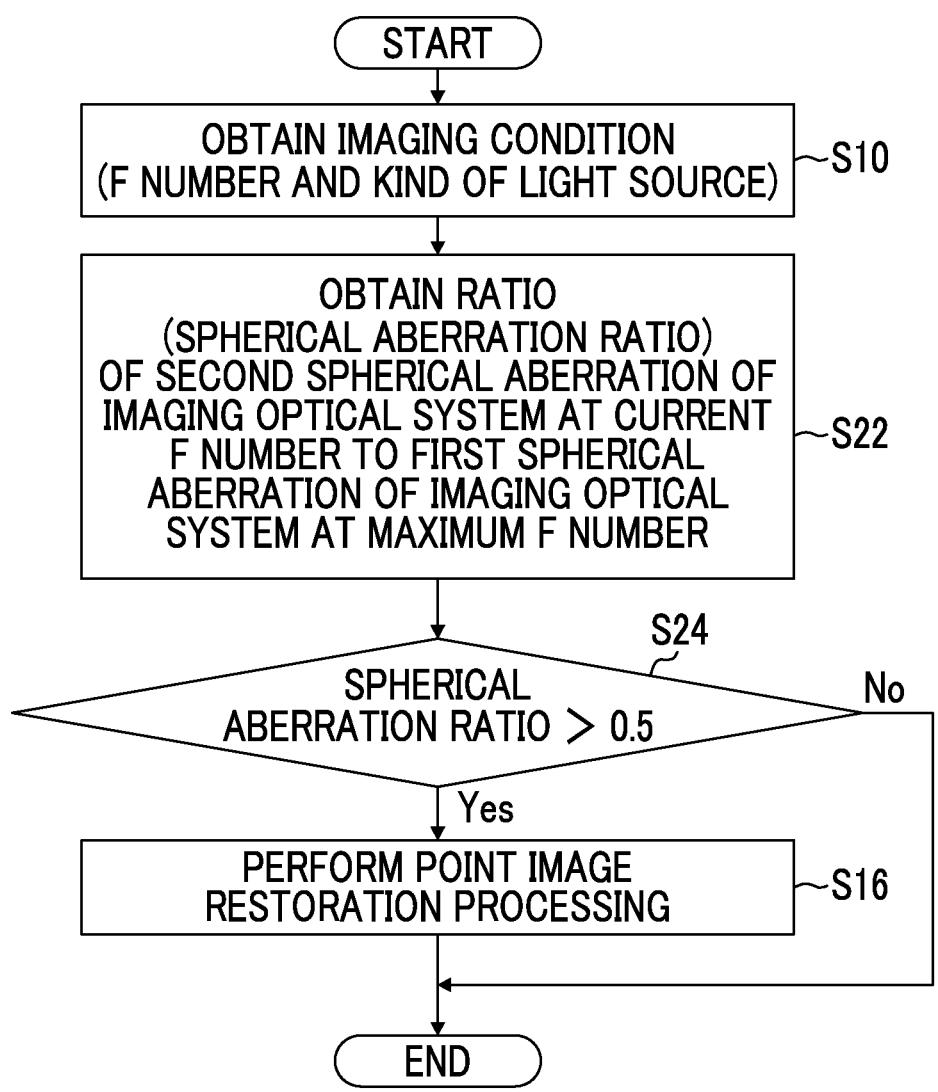
FIG. 11 is a flowchart showing a third embodiment of the image processing method.

FIG. 11 is a flowchart showing a third embodiment of the image processing method according to the present invention. In FIG. 11, steps in common with those in the first embodiment shown in FIG. 9 will be assigned the same step numbers, and the detailed description thereof will be omitted.

In FIG. 11, the determination unit 53 of the third embodiment obtains the spherical aberration ratio which is the ratio of the second spherical aberration (determined by the F number and the kind (wavelength) of the light source obtained in step S10) of the imaging optical system at the time of imaging to the first spherical aberration (determined by the kind (wavelength) of the light source obtained in step S10) of the imaging optical system in a case where the diaphragm is the full aperture (maximum F number) (step S22).

Subsequently, the determination unit 53 determines whether or not the spherical aberration ratio obtained in step S22 exceeds the second threshold value (0.5), and determines to perform the point image restoration processing in a case where the spherical aberration ratio exceeds 0.5 (in the case of "Yes"). The processing proceeds to step S16 (step S24). The reason is that in a case where the spherical aberration ratio exceeds 0.5 and the lens 16 has spherical aberration of 2λ at the time of opening, the MTF is less than 50% and the image data does not satisfy the desired image quality needed in the inspection of the product.

Meanwhile, in a case where the spherical aberration ratio obtained in step S22 is equal to or less than 0.5 (in the case of "No"), the determination unit 53 determines not to perform the point image restoration processing. The present processing is ended (step S24). In a case where the spherical aberration ratio is equal to or less than 0.5 and the lens 16 has spherical aberration of 2λ at the time of opening, since the MTF is equal to or greater than 50% and the image data satisfies the desired image quality, it is not necessary to perform the point image restoration processing.

[Others]

Although the imaging device 10 used in the machine vision system has been described in the present embodiment, the purpose of the imaging device 10 is not limited to the purpose of the machine vision. The imaging device may be applied to a general digital camera, digital video camera, and surveillance camera, and an effect may be acquired by using a camera which is frequently used in the range of the F number in which the small diaphragm blur does not occur.

Although it has been described in the present embodiment that the image processing unit 35 (FIGS. 2, 3, and 8) in the camera controller 28 of the imaging device 10 functions as the image processing device according to the present invention, the present invention is not limited thereto. In a case where the RAW data is transmitted to the computer 60 from the imaging device 10, the image processing unit (image processing device) of the computer 60 may be the image processing unit of the computer 60 so as to function as the image processing unit 35 in the camera controller 28. In this case, in a case where the computer 60 does not control the imaging condition through the camera controller 28, the camera controller 28 needs to transmit the RAW data and the imaging condition such as the F number at the time of imaging to the image processing unit of the computer 60.

Although the point image restoration processing of the present embodiment uses the convolution type Wiener filter as the restoration filter, the present invention is not limited thereto. For example, the restoration filter in the spatial frequency domain shown in [Expression 1] may be used. In this case, it is necessary that the Fourier transform is performed on the input image data, the image data in the spatial frequency domain on which the Fourier transform is performed and the restoration filter in the spatial frequency domain are multiplied, and the inverse Fourier transform is performed on the multiplied result.

The present invention is not limited to the above-described embodiments, and may be modified without departing from the spirit of the present invention.

EXPLANATION OF REFERENCES

10: imaging device
12: lens unit
16: lens
18: diaphragm
20: optical system operating unit
26: imaging element
28: camera controller
32: input and output interface
34: device controller
35: image processing unit
40: illumination device
51, 52: point image restoration processing unit
51A, 52A: restoration filter processing unit
51B: restoration filter storage unit
51C: restoration filter selecting unit
52B: point spread function storage unit
52C: restoration filter generating unit
53: determination unit
54: changeover switch
54A: first input
54B: second input
54C: movable portion
60: computer
62: computer input and output unit
64: computer controller
66: display
S10 to S24: step
f: focal length
λ: wavelength
$F_0$: maximum F number
F: F number at the time of imaging
$L_0$: pupil diameter at the time of opening
L: pupil diameter at the time of imaging
T: ratio of pupil diameter

What is claimed is:

1. An image processing device comprising:
   processing circuitry configured to:
      perform point image restoration processing using a restoration filter based on a point spread function of an imaging optical system on image data obtained from an imaging element through imaging of a subject using an imaging unit having the imaging optical system and the imaging element; and
      determine whether or not to perform the point image restoration processing based on spherical aberration of the imaging optical system changed by an imaging condition,
   wherein the processing circuitry performs the point image restoration processing only in a case where it is determined by the processing circuitry to perform the point image restoration processing,
   wherein a first spherical aberration is a spherical aberration of the image optical system in a case where a diaphragm constituting the image optical system is a full aperture,
   wherein a second spherical aberration is a spherical aberration of the imaging optical system that is changed by the imaging condition, and
   wherein, if a ratio of the second spherical aberration to the first spherical aberration exceeds a second threshold value, the processing circuitry determines to perform the point image restoration processing.

2. The image processing device according to claim 1, wherein the imaging condition is an F number of a diaphragm constituting the imaging optical system.

3. The image processing device according to claim 2, wherein the processing circuitry determines whether or not to perform the point image restoration processing using the processing circuitry based on the F number of the diaphragm.

4. The image processing device according to claim 1, wherein, in a case where the spherical aberration of the imaging optical system changed by the imaging condition is equal to or greater than a first threshold value, the processing circuitry determines to perform the point image restoration processing using the processing circuitry.

5. The image processing device according to claim 4, wherein, in a case where a wavelength for determining the spherical aberration is $\lambda$, the first threshold value is $0.6\lambda$.

6. The image processing device according to claim 1, wherein the second threshold value is 0.5.

7. The image processing device according to claim 1, wherein the imaging condition is a kind of a light source that illuminates the subject or a wavelength of the light source.

8. The image processing device according to claim 7, wherein the processing circuitry uses the spherical aberration corresponding to the kind of the light source that illuminates the subject or the wavelength of the light source, as the spherical aberration of the imaging optical system changed by the imaging condition.

9. The image processing device according to claim 1, wherein, in a case where the diaphragm constituting the imaging optical system is at least an full aperture, the imaging optical system has the spherical aberration at which the processing circuitry determines to perform the point image restoration processing.

10. An imaging device comprising:
the image processing device according to claim 1; and
the imaging unit.

11. The imaging device according to claim 10, wherein the imaging device is used as an industrial camera.

12. An image processing method comprising:
a step of performing point image restoration processing using a restoration filter based on a point spread function of an imaging optical system on image data obtained from an imaging element through imaging of a subject using an imaging unit having the imaging optical system and the imaging element; and
a step of determining whether or not to perform the point image restoration processing based on spherical aberration of the imaging optical system changed by an imaging condition,
wherein, in the step of performing the point image restoration processing, the point image restoration processing using a restoration filter is performed only in a case where it is determined to perform the point image restoration processing,
wherein a first spherical aberration is a spherical aberration of the image optical system in a case where a diaphragm constituting the image optical system is a full aperture,
wherein a second spherical aberration is a spherical aberration of the imaging optical system that is changed by the imaging condition, and
wherein, in the step of determining whether or not to perform the point image restoration processing, if a ratio of the second spherical aberration to the first spherical aberration exceeds a second threshold value, it is determined to perform the point image restoration processing.

13. The image processing method according to claim 12, wherein the imaging condition is an F number of a diaphragm constituting the imaging optical system.

14. The image processing method according to claim 13, wherein, in the step of determining whether or not to perform the point image restoration processing, it is determined to whether or not to perform the point image restoration processing based on the F number of the diaphragm.

15. The image processing method according to claim 12, wherein, in a case where the spherical aberration of the imaging optical system changed by the imaging condition is equal to or greater than a first threshold value, it is determined to perform the point image restoration processing in the step of determining whether or not to perform the point image restoration processing.

16. The image processing method according to claim 15, wherein, in a case where a wavelength for determining the spherical aberration is $\lambda$, the first threshold value is $0.6\lambda$.

17. The image processing method according to claim 12, wherein the second threshold value is 0.5.

* * * * *